United States Patent [19]

Lance

[11] Patent Number: 4,462,635
[45] Date of Patent: Jul. 31, 1984

[54] SEAT WITH ADJUSTABLE BACK SUPPORT

[76] Inventor: Mark A. Lance, 405 Moreland Rd., Pascoe Vale South, Victoria, Australia

[21] Appl. No.: 234,285

[22] Filed: Feb. 13, 1981

[30] Foreign Application Priority Data

Feb. 29, 1980 [AU] Australia .............................. PE2604

[51] Int. Cl.³ .......................... A47C 7/46; A47C 3/00
[52] U.S. Cl. .................................... 297/284; 297/452
[58] Field of Search .............................. 297/284, 452

[56] References Cited

U.S. PATENT DOCUMENTS

| | | | |
|---|---|---|---|
| 1,182,854 | 5/1916 | Poler | 297/284 |
| 2,692,010 | 10/1954 | Christie | 297/284 |
| 3,258,259 | 6/1966 | Bohlin | 297/284 |
| 4,153,293 | 5/1979 | Sheldon | 297/284 |
| 4,309,058 | 1/1982 | Barley | 297/284 |

FOREIGN PATENT DOCUMENTS 360516 11/1931 United Kingdom ................ 297/284

*Primary Examiner*—Francis K. Zugel

[57] ABSTRACT

This invention relates to a seat having a strap and a tension device therefore for adjusting the support for the back of a user. The adjusting device including a strap or straps extending across the back rest of a seat and being manually adjustable for decreasing or increasing the effective length of the strap or straps where extending across the back rest so as to cause portion of the back rest to project forwardly a greater or lesser extent.

8 Claims, 5 Drawing Figures

1

SEAT WITH ADJUSTABLE BACK SUPPORT

BACKGROUND OF THE INVENTION

This invention relates to a seat having means for adjusting the support for the back of a user and it refers particularly, but not exclusively, to an automobile seat having means for adjusting the support for the lumbar region of a user's back.

Different means have been proposed for adjusting the back rests of seats, such as automotive seats, so as to provide greater or lesser support for the lumbar region of the back but the means proposed have been rather complex in construction and do not provide a desirable fineness of adjustment.

SUMMARY OF THE INVENTION

Accordingly, it is an object of this invention to provide a seat having back rest adjusting means which will be of simple construction, easy to operate, and which will enable the support for the lumbar region of the back to be adjusted to suit the requirements of the person occupying the seat.

Another object is to provide a seat, such as a motorcar seat, having a variable contour support for the back which may be adjusted to maximise comfort and minimise fatigue.

According to the invention devised with these and other objects in view there is provided a seat having a base or seat, a back rest supported in desirable fixed or adjustable relationship to the base or seat, and means for adjusting the lumbar region of the back rest so as to cause it to project forwardly relative to the seat to a greater or a lesser extent, characterised in that the lumbar region adjusting means include a strap extending across the back rest and means for decreasing or increasing the effective length of the strap where it extends across the back rest so as to cause the said portion of the back rest to project forwardly a greater or lesser extent.

There may be provided a cushion of resilient material between the strap and the back of the seat—such as a cushion of foam plastics or foam rubber, and the means for adjusting the effective length of the strap may be at least one hand-operable adjusting screw means by which the length of the strap, from an anchorage point adjacent one side of the seat back to a strap guide adjacent the other side of the seat back, may be adjusted as required. There may be one or two of said adjusting screw means for one length of strap.

If desired there may be provided more than one adjusting strap at spaced locations in the height of the seat back rest, so that the adjustment may be effected over a greater length of lumbar region, with appropriate adjusting means for each said strap.

The accompanying drawings illustrate one practical embodiment of an adjustable back support for a seat constructed in accordance with the present invention. The drawings show only such parts of a seat necessary to illustrate the application of the present invention.

DESCRIPTION OF THE PREFERRED EMBODIMENT

Figure 1:
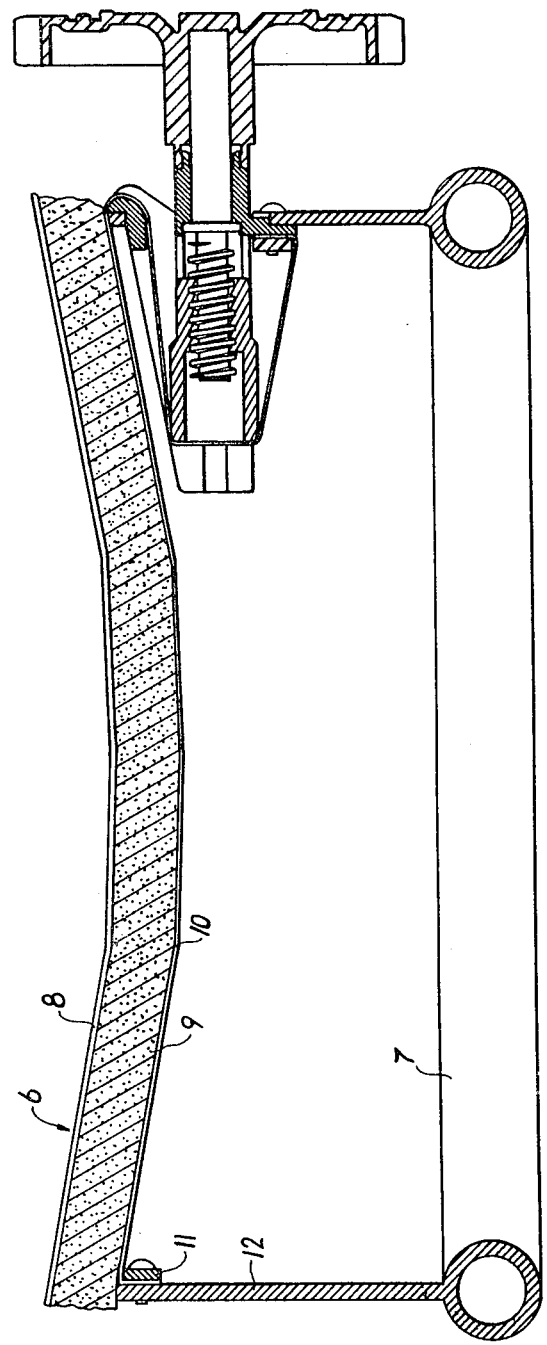
FIG. 1 is a sectional plan view of a seat back rest at the lumbar region showing one embodiment of an adjustable screw means for decreasing or increasing the length of a strap extending across the back rest.
Figure 2:
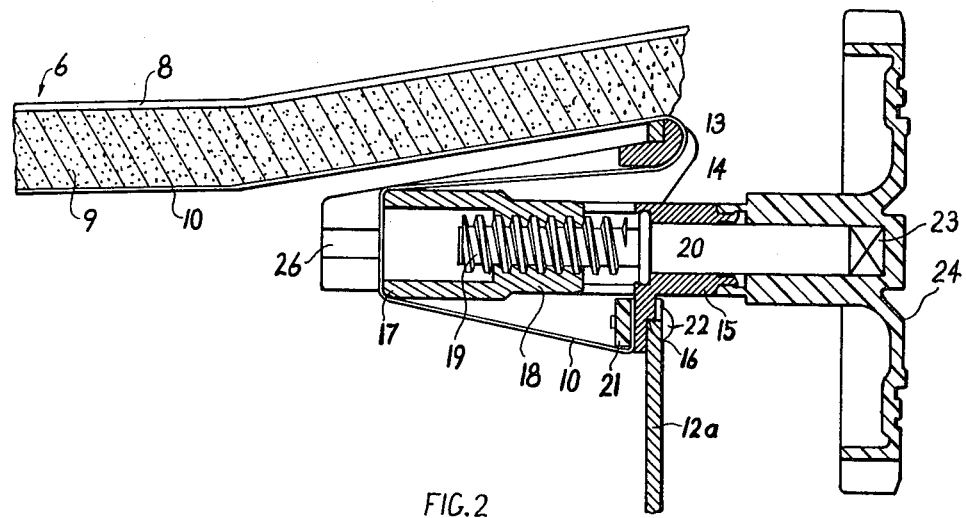
FIG. 2 is a detail plan view in section of the adjustable screw means shown in FIG. 1.
Figure 4:
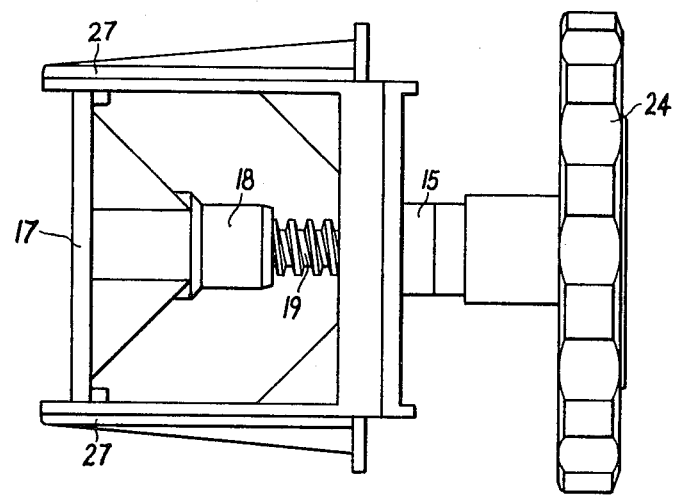
FIG. 4 is a view in elevation of the adjustable screw means.

The seat back rest 6, as illustrated in FIG. 1 has a base frame 7 for supporting the back rest 6 and that base frame may be adjustable relative to the base or seat (not shown) so that the angle of inclination of the back rest may be adjusted, as is customary. Forwardly of the base frame 7 is the material 8 covering the back rest. Behind that material is a padding 9 of suitable material and in the lower part of the back rest—corresponding in location to the lumbar region of the back of a person using the seat—is a strap 10 extending transversely across the back. As shown, one end of the strap 10 is attached at 11 to a side frame member 12 and supported at the other side by a guide 13 on a mounting frame 14 which is secured to the other side frame member 12a of the base frame. Said guide 13 is attached to and forms part of the frame 14 which has an integral boss 15 which boss 15 and guide 13 extend through a hole 16 in the side member 12a of base frame 7. The other end of the tensioning strap 10 passes over guide 13 and over a strap carrier 17 which forms part of a nut 18 engaging the threaded end 19 of shaft 20 rotatably supported in boss 15. The strap 10 then passes to the rear of mounting frame 14 where it is secured by fixing plate 21 and appropriate fixing screws 22 which may also secure the mounting frame 14 in position relative to said side member 12a. The outer end of the shaft 20 is flattened or squared at 23 to engage a corresponding recess in the hub of a knob or finger wheel 24. The inner end of hub of the knob 24 and the abutting end of boss 15 are formed with snap fit engaging formations to permit the knob to be rotated but to prevent axial movement thereof. The shaft 20 is formed with a medial collar arranged to provide a snap fit in a recess in the inner end of the boss 15, the arrangement being such as to provide for rotation of the shaft but to prevent axial movement thereof.

Figure 5:
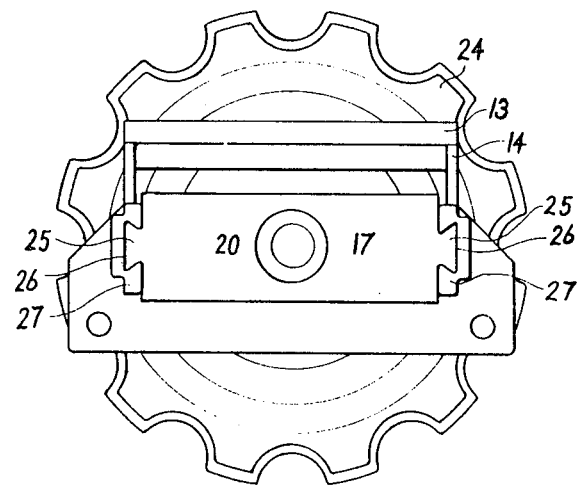
FIG. 5 is an end view of the adjustable screw means shown in FIGS. 3 and 4.
Figure 3:
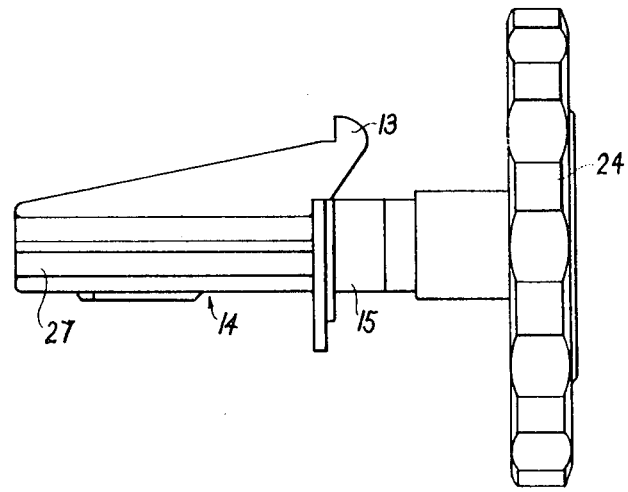
FIG. 3 is a plan view of the adjustable screw means shown in FIG. 1.

The strap carrier 17 forming part of nut 18 is in the form of a foot to engage the strap 10 and has at its outer side margins T formations 25 to engage correspondingly shaped guide grooves 26 in side arms 27 of the mounting frame 14 (see FIG. 5).

Rotation of the knob 24 will cause rotation of the adjustment screw 19 to thereby cause the nut 18 and strap carrier 17 to move either inwardly or outwardly, the formations 25 and grooves 26 preventing rotation of the nut and ensuring axial movement only of the nut 18. The strap carrier 17 engages with the tensioning strap 10 to cause the effective length of said strap between its end 11 and the guide 13 to be reduced or increased as the nut 18 is caused to travel inwardly or outwardly relative to the adjustment screw 19 by turning of the knob 24.

It is apparent that as that effective length is reduced the back rest, at the lumbar region, will be caused to project forwardly and when the length is increased it will be permitted to retract.

In the case of a bucket-type seat there may be two of the adjustment means, one at each side and the end 11 of the strap 10 will be passed through the second adjustment means, to be anchored by a second strap carrier 17 and fastener 21. If two such adjustment means are provided it may be of advantage to have the screw on one a right-hand thread and on the other a left hand thread, so that the adjustment may be effected by simultaneous operation in the same direction in relation to the seat.

Naturally, the details of construction of the seat itself do not form part of this invention. Thus, the design and construction of the back rest may be modified to suit particular requirements, as may the mode of attachment of the tensioning strap to the seat. The seat back rest may be provided with additional spring members or padding, and the foam cushion or other padding behind the covering material may be covered with any suitable material to provide for ease of travel of the tensioning strap across the back of the back rest.

If desired there may be two of said tensioning straps across the back of the back rest and they may be adjusted either by individual adjusting means or by the operation of a single adjusting means operable to effect adjustment on both straps simultaneously.

The strap (or straps) may be made of any suitable material, such as nylon webbing, and may be covered with suitable protective material—which may be resilient (such as foam).

If desired the mounting frame need not be secured to the side frame member 12a as the tension of the strap will tend to hold it in position. However, it is believed one or more screw fasteners may be used to ensure a firm connection therewith when no pressure is applied to the back rest.

It is believed this invention may be applied to seats other than automotive seats, e.g. seats in an aircraft, and, indeed, to other articles for the support of the body.

While the invention has been particularly shown and described with reference to a preferred embodiment thereof, it will be understood by those skilled in the art that various changes in form and details may be made therein without departing from the spirit and scope of the invention.

I claim:

1. An adjustable assembly for a seat having a back support with peripheral frame and a base, said frame including two substantially rigid portions spaced apart a predetermined distance defining a support region, said assembly comprising flexible means spanning said distance between said portions and actuating means between said portions for controlling tension in said flexible means, said flexible means having one end fixedly secured to one of said portions, an intermediate portion slidably supported on a part of the other of said rigid portions and disposed over said actuating means, and an opposite end fixedly secured to another part of the other of said rigid portions, said actuating means adapted to shift said intermediate portion to induce or relieve tension in said flexible means, threaded means for moving said carrier means whereby an adjustable assembly positioned proximate the lumbar region of said back support permits adjustment of the amount of protrusion of said back support across the entire predetermined distance.

2. An adjustable assembly as claimed in claim 1 and wherein a cushion of resilient material is provided between the flexible means and the back of the seat.

3. An adjustable assembly as claimed in claim 1 and wherein the actuating means for adjusting the effective length of the strap comprises as least one hand-operable adjusting screw means.

4. An adjustable assembly as claimed in claim 1 and wherein the actuating means for adjusting the effective length of the flexible means comprises a mounting frame located relatively to the back support, said frame incorporating a guide for the flexible means cooperating with said carrier means engaging the flexible means and arranged for inward and outward movement under the control of an adjustment screw so as to adjust the effective length of the flexible means.

5. An adjustable assembly as claimed in claim 4 wherein there is a screw-threaded shaft rotatably supported in the mounting frame, a nut, of which the carrier means forms part, engaged on the screw-threaded shaft, and an operating knob fastened to the shaft.

6. An adjustable assembly as claimed in claim 4 and wherein the carrier means is in the form of a foot to engage the flexible means, said carrier means having guide formations at each side to engage cooperating formations in the mounting frame.

7. An adjustable assembly as claimed in claim 4 and wherein there is a screw-threaded shaft rotatably supported in the mounting frame, an operating knob is fastened to the shaft, and means are provided to prevent axial movement of the shaft and operating knob relative to the mounting frame.

8. An adjustable assembly as claimed in claim 4 and wherein the mounting frame is located and secured in an aperture in one of said portions of said frame.

* * * * *